(12) United States Patent
Atkinson (10) Patent No.: US 6,633,669 B1
(45) Date of Patent: *Oct. 14, 2003

(54) AUTOGRID ANALYSIS

(75) Inventor: Matthew Robert Cole Atkinson, Cottage Grove, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/422,535

(22) Filed: Oct. 21, 1999

(51) Int. Cl.[7] .................................................. G06K 9/46
(52) U.S. Cl. ........................ 382/174; 382/174; 382/201; 382/288
(58) Field of Search ................................ 382/289, 288, 382/291, 129, 133, 174, 201

(56) References Cited

U.S. PATENT DOCUMENTS

| | | | | |
|---|---|---|---|---|
| 4,513,438 A | * | 4/1985 | Graham et al. | 318/640 |
| 5,155,706 A | * | 10/1992 | Haley et al. | 367/11 |
| 5,703,959 A | * | 12/1997 | Asano et al. | 382/133 |
| 5,900,949 A | | 5/1999 | Sampas | |
| 5,946,030 A | | 8/1999 | Cooper | |
| 6,199,986 B1 | | 3/2001 | Williams et al. | |
| 6,345,115 B1 | * | 2/2002 | Ramm et al. | 377/10 |
| 6,349,144 B1 | * | 2/2002 | Shams | 382/129 |
| 6,477,273 B1 | * | 11/2002 | Cole Atkinson | 382/174 |

FOREIGN PATENT DOCUMENTS

| | | |
|---|---|---|
| GB | 2318637 A | 4/1998 |
| WO | WO 98/47006 | 10/1998 |
| WO | WO 99/08233 | 2/1999 |

OTHER PUBLICATIONS

*The Image Processing Handbook,* second edition by John C. Russ (CRC PRess 1995) pp. 394–396, 416–418.
MicroArray Suite, http://www.scanalytics.com/sos/product/bio/bodyMicroArray.html, Mar. 19, 2000.
IPLab MicroArray Suite for Macintosh, http://www.genefocus.com/sos/product/hts/bodyMicroArray.html Mar. 19, 2000.
MACROview™, http://www.genefocus.com/specifications_Macroview_software.htm, Mar. 19, 2000.
Molecularware, http://www.molecularware.com/Products/Array Analyzer/Array Analyzer.html, Mar. 19, 2000.
COSE XDotsReader Software, (and the following pages), http://www.cose.fr/us_dots.html , Mar. 19, 2000.

* cited by examiner

Primary Examiner—Jon Chang
(74) *Attorney, Agent, or Firm*—Charles L. Dennis, II; Philip Y. Dahl (57) ABSTRACT

A method and apparatus for identifying the orientation and positions of the elements of a grid in an image. The elements of the grid need not be parallel to the sides of the image, and the image need not contain all of the elements of the grid. The method can be applied to rectilinear and curved grids. The addresses of identified grid elements can be used to control, e.g., analytical procedures directed to individual elements.

68 Claims, 3 Drawing Sheets

AUTOGRID ANALYSIS

BACKGROUND OF THE INVENTION

1. Technical Field

The present invention relates to methods of identifying objects in an image, and in particular, to identifying the orientation and position of a grid in an image, and using the resulting grid for measurement.

2. Description of the Related Art

Many applications of machine vision and analysis analyze images which contain information arranged in a grid. For example, WO 99/08233 describes a large number of different types of analyses which can be conducted on assay well plates, gels and blots used in chemical, biochemical and physiological analyses. In that use, the positions of elements on a grid are identified and the elements are probed using a wide variety of assays.

WO 98/47006 takes this a step further, by using the image to identify locations of points on a grid, and injecting reagents onto the grid, e.g., with an ink jet sprayer.

In both cases, however, the position and orientation of the grid are generally known. WO 99/08233 suggests allowing for some slight variation in the grid through the use of fuzzy logic, but the nature of the fuzzy logic to be applied is not described in the application. WO 98/47006 simply assumes one knows the orientation and size of the grid.

In addition to these chemical applications, there are many manufactured products which include grid-like arrays or cross hatching, such as printed or micro-replicated materials, and chip sockets. Machine vision is a useful way of inspecting such products, but, again, there must be some ability to determine the orientation and position of each element in the grid for this to be useful.

In addition, most electronic analytical systems conduct measurements for every pixel in the field of view. In non-electronic viewing systems, there has been some suggestion to study only interesting features, e.g., to save the time for cytologists, GB 2,318,627 suggests having a system automatically identify interesting features and move a slide under a microscope to jump from one interesting feature to the next, so that the cytologist need only look at the interesting features. However, past conventional electronic scanning systems generally have scanned and analyzed every pixel in the field of view. Particularly if several measurements are being made, e.g., at different frequencies or under different excitation conditions, this collection of data from every pixel can be quite time consuming, since, for example, even a typical 512x512 pixel image has 262, 144 pixels, and the scanning system must be physically re-adjusted on each pixel in turn.

SUMMARY OF THE INVENTION

The present invention identifies the orientation and position in a field of view of the elements or features of a grid. The grid may have some degree of variance from a purely rectilinear grid, particularly if the variance is generally along a single axis of the grid.

To achieve this according to the present invention, an image of a field of view containing a grid is first obtained and digitized into pixels. Using any suitable algorithm, individual features in the image are identified. The centroid position of each feature, the feature area in pixels and the integrated intensity of the feature all are determined. These are used to produce a "collapsed image," where each feature is represented by a point object at the centroid location, with the point object having two associated values (area and integrated intensity).

According to a first embodiment of the invention, a search line is created at one side of the image at a base angle $\theta$ to the side of the image, and swept across the image in steps. At each step, the integrated intensity of each centroid within a predetermined region on either side of the line is determined and recorded. The result is a two dimensional plot with a series of peaks, each peak corresponding to a column of the grid.

Note that this process is different from simply integrating the image intensity along the search line. Due to the use of collapsed images, each feature effectively has its image intensity and area concentrated at its centroid. This will be referred to herein as "centroid integration", and is discussed in more detail in a co-assigned patent application filed on even date herewith, 09/422,584, now U.S. Pat. No. 6,477,273, which is incorporated herein by reference.

Centroid integration results in a set of very well defined peaks in the resulting line profile. Regular integration would result in a set of smeared out peaks and, in the case of a grid with some variation in the positions of the individual features, the result would often be unusable. As a result, centroid integration is much more tolerant of local variation in feature positions than conventional integration.

Centroid integration is repeated with two additional search lines starting at a slight variance angle (+$\delta$ and −$\delta$) to the original search line and swept across the image.

The slope of the first peak on each of the three search lines is determined. The first peak represents the first column, and the steeper the slope on that peak, the closer that search line was to being parallel to the column of the grid. If the difference between the slopes of the three lines is above a predetermined threshold (i.e., outside a tolerance limit), the line with the steepest first peak slope is identified. If it is the middle line, the process is iterated using a smaller variance angle ±$\delta$. If it is not the middle line, the base angle $\theta$ is reset to match the angle of line with the steepest slope, and the process is iterated using the same variance angle ±$\delta$ around the new base angle $\theta$. The entire process is iterated until the difference is within the tolerance limit. The angle of the resulting line with the steepest first peak slope will match the angle of the first column of the grid (within the predetermined tolerance limit).

This process is repeated for each peak. For example, the second peak will correspond to the second column, so the search line with the steepest slope on the second peak is the closest to the angle of the second line of the grid. Repeating centroid integration using sweep lines at a base angle $\theta$ and variance angles (±$\delta$) to find the slope of the second peak can define the angle of the second column. The process is repeated for each peak.

After the first peak, it is not necessary to start the sweep lines at the side of the image—each sweep line can be started from position of the prior column. In addition, the angle of each column will probably be reasonably close to the angle of the prior column, so the number of sweeps usually can be minimized by starting with a base angle $\theta$ matching the angle of the prior column.

Once the position and orientation of each of the columns is identified, the next step is identifying the rows generally orthogonal to the columns just identified. The rows can be identified using substantially the same process as used to identify the columns, but starting from a side of the image adjacent to the side used to find the columns. The intersections of the best fit columns and the best fit rows are determined, and used to define the nominal points in the grid.

The grid of nominal points preferably is "flexed" to define a final grid. To do this, a local search is performed at each nominal grid point for the local centroid, that is, the centroid nearest in position to the nominal grid point. The position of the local centroid is defined as the final grid point.

In some situations, only portions of a single object on a sample will appear in an image, with the results that multiple features are identified instead of a single feature. This might happen, for example, due to the characteristics of the object on the sample, or due to the image capture technique. An alternate aspect of the invention therefore is to find a centroid of the centroids within a predetermined distance of the nominal grid point, and to define this centroid of centroids as the final grid point. As will be apparent, if a single object is represented by multiple features, this will resolve the multiple features into an effective single feature, while if a single object is represented by a single feature, the centroid of centroids will be in the same position as the centroid of the single feature, so this will have no significant effect.

If no centroid or centroid of centroids is found within some predetermined maximum distance of a nominal grid point, it normally will be assumed that the feature (and centroid) expected at that point is missing, and the nominal grid point is retained as the final grid point.

The locations of all of the final grid points in the flexed grid provide an addressable array of points for the elements in the grid.

According to a second embodiment of the invention, the corners of a grid array are identified first. To do this, a search line is started at a corner of the image, oriented with its normal bisector pointing towards the center of the image. The search line is moved towards the center of the image. The first centroid having an area and/or integrated intensity above a certain threshold limit which is encountered by the line is identified as the corner of the grid for that line. The remaining corners of the grid are identified in similar fashion with lines starting at the other corners of the image. The nominal outline of the grid array is defined by fitting a line between the four identified corners.

Next, a search is conducted along each of the lines in the nominal outline to identify additional centroids forming the outline. Preferably, this identification includes centroids within a predetermined distance of the nominal outline, to allow for a small amount of variability in the grid vertex positions.

If there are no features outside the nominal box plus a margin, then the grid is assumed to be (a) generally rectilinear. A search line is set up parallel to one of the lines forming the nominal outline of the grid. This search line is moved across the image in a series of steps to perform centroid integration, and identify the columns in the grid. A similar search line is set up parallel to an adjacent side of the nominal outline of the grid, and moved across the image to identify the rows in the grid.

If there are features outside one side of the nominal outline of the array, then the grid is assumed to be (b) curved toward that side. In the case of a grid which is distorted by curvature along one axis, a procedure similar to that for a rectilinear grid can be used to identify the grid points, but the procedure must take the curve into account. This is done by using a curved search line which matches the curvature of the grid. Any suitable method of identifying the curve can be used, and, once the curve is identified, the lines are moved in essentially the same fashion as with the rectilinear case (a) above.

In either the rectilinear or curved case, the intersections of the resulting best fit column and rows are used to define the nominal grid points. The grid is flexed to identify the local centroids and final grid positions.

The second embodiment generally requires the entire grid to be in the image, since it starts by finding the corners of the grid. In many situations, e.g., quality control of a large, moving web in production, the grid is not entirely within the image, but the orientation of the grid in the image is known, e.g., because the placement of the field of view relative to the web is known. If so, the grid spacing and position can be identified by using a variation of the second embodiment. In this variation, no attempt is made to identify the corners of the grid, since that is not possible. Instead of using search lines oriented parallel to the sides of the nominal outline defined by the corners of the grid, the same process as in the second embodiment is undertaken using search lines oriented roughly parallel to the expected columns and rows.

Note that very little initial information is required about the number or spacing of the rows and columns in the grid, or about their orientation or position within the field of view. In the case of the first embodiment, all that is needed is to know that the grid is generally rectilinear. In the case of the second embodiment, all that is needed is to know that the grid is significantly curved in at most one direction and either that the entire grid is in the image, or that the orientation of the grid relative to the image is known. The method of the invention will identify all other information directly.

This low need for initial information has the distinct advantage of minimizing the care that need be taken in placing a grid in the field of view prior to imaging. For example, in the case of a grid used for combinatorial chemistry assays, the grid can simply be placed in the field of view for imaging, with no particular orientation or placement within the field required. Since accurate placement and orientation is time consuming, this can significantly accelerate review of large numbers of samples.

The foregoing analysis can be made from a single image of the field of view, without having to re-focus the system on each pixel. Further reductions in processing time can be achieved by using the information about the grid positions thus obtained to analyze just the significant locations in the field of view, not every pixel in the image. This can be done by re-adjusting the system to study just the pixels surrounding each centroid. Alternatively, the system can be re-adjusted so that the field of view substantially matches the feature around each centroid, and each feature can be analyzed in a single step. The system is re-adjusted from one feature to the next to analyze all of the features.

Typically, the number of features in a grid (e.g.., 96 in a DNA grid array) is significantly lower than the total number of pixels in the image (e.g., 262,144 in a 512×512 pixel image). Even if a moderate number of pixels (say 30–50) around each centroid must be analyzed, this dramatically reduces the total number of measurements (262,144 down to 2880–4800) which must be made and analyzed. If system is re-adjusted to match each feature, the total number of measurements needed is even lower, matching the number of features at 96. In either case, total processing time can be reduced markedly from the time required to measure every pixel in the image.

DETAILED DESCRIPTION OF THE PREFERRED EMBODIMENTS

Figures 1, 2:
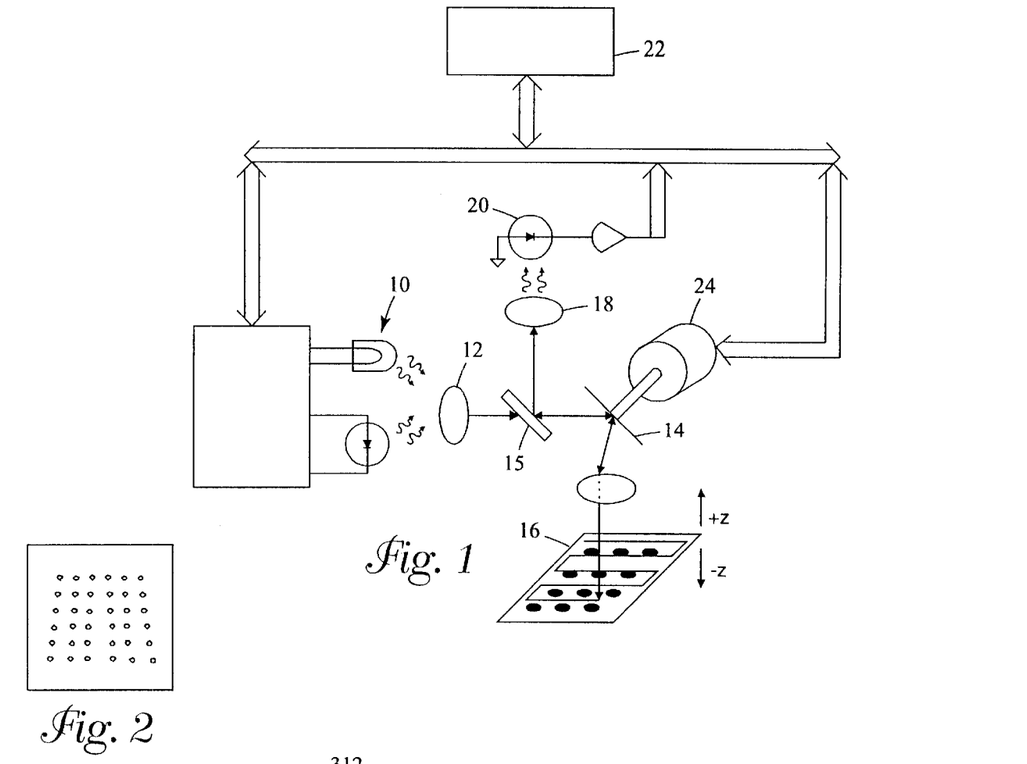
FIG. 1 is a schematic illustration of a prototypical scanning system with which the present invention might be used.
FIG. 2 is an illustration of an image which might be captured by the scanning system of FIG. 1.

FIG. 1 illustrates a scanning system with which the present invention might be used. In the system of FIG. 1, a focused beam of light moves across an object and the system detects the resultant reflected or fluorescent light. To do this, light from a light source 10 is focused through source optics 12 and deflected by mirror 14 onto the object, shown here as a sample 3×4 DNA array plate 16. The light from the light source 10 can be directed to different locations on the sample by changing the position of the mirror 14 using motor 24. Light that fluoresces or is reflected from sample 16 returns to detection optics 18 via mirror 15, which typically is a half silvered mirror. Alternatively, the light source can be applied centrally, and the emitted or fluoresced light can be detected from the side of the system, as shown in U.S. Pat. No. 5,900,949, or the light source can be applied from the side of the system and the emitted or fluoresced light can be detected centrally, or any other similar variation. Light passing through detection optics 18 is detected using any suitable image capture system 20, such as a television camera, CCD, laser reflective system, photomultiplier tube, avalanche photodiode, photodiodes or single photon counting modules, the output from which is provided to a computer 22 programmed for analysis and to control the overall system. Computer 22 typically will include a central processing unit for executing programs and systems such as RAM, hard drives or the like for data storage. It will be understood that this description is for exemplary purposes only; the present invention can be used equally well with "simulated" images generated from magnetic or tactile sensors, not just with light-based images, and with any object to be examined, not just sample 16.

FIG. 2 illustrates an image of the field of view captured by any suitable system, such as that show in FIG. 1. If not initially created in digital form by the detecting equipment, the image is digitized into pixels. Features of interest in the image are identified by any suitable means. For example, features that are brighter or darker than a certain threshold intensity or features that are between two limiting threshold intensities might be identified as features of interest. Individual features are composed of touching pixels that satisfy the image intensity threshold requirements. This feature detection ability is available in most commercial image capture software packages. A detailed description of one method for achieving this can be found at *The Image Processing Handbook*, second edition by John C. Russ (CRC Press 1995) pages 394–96, 416–18.

Once the features are identified, a "collapsed image" is created. To do this, the centroid of each feature is determined, that is, the point that represents the center of the object based on a weighting scheme. A given feature may or may not be circular, so any suitable algorithm for identifying the centroid may be used, such as integrating intensity or position. The position of the centroid may be recorded in any suitable coordinate system, but typically will be in an X-Y coordinate system. In addition to the centroid, the feature area in pixels, and the integrated intensity of the feature all are determined, and stored in the memory of computer 22. The resulting collapsed image condenses the enormous amount of data in the complete image, e.g., 512×512 pixels of information, to a much smaller array, e.g., 3×4×4 for sample 16, which nevertheless still contains the information needed for present purposes, resulting in dramatically improved processing times.

Note that while the invention is described herein in terms of lines and curves moving across an image, with centroids being within predetermined distances of lines or points, this is for ease of description. It will be understood by one of skill in the art that it is not necessary to actually make such steps visible on a screen or other display device. Computer 22 can make the relevant calculations, or any mathematically equivalent calculations, without providing a display in the process. For example, computer 22 can process the data most expeditiously by comparing the locations and values in the condensed image array to the calculated locations of the relevant lines and points to which the centroids are being compared.

Also, as used herein, "column" will be used to indicate general alignment of the centroids of a grid in one direction, and "row" to indicate general alignment of the centroids in a direction generally orthogonal to the columns. It will be understood that which direction is the column and which the row is entirely arbitrary, so no significance should be attached to the use of one term over the other, and that the rows and columns may not be entirely straight.

Figure 3A:
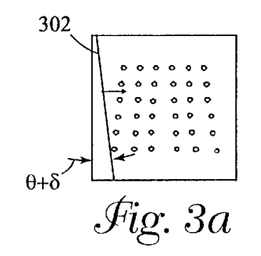
FIGS. 3a, 3b, 3c are illustrations of a scanning process applied to the image of FIG. 2 according to the present invention.
Figure 3B:
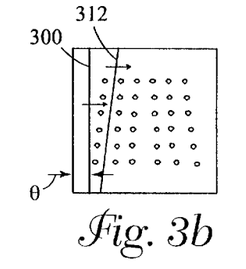
Figure 4A:
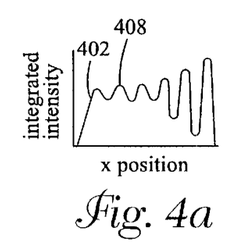
FIGS. 4a, 4b, 4c are graphs illustrating the initial results of the centroid process illustrated in FIGS. 3a, 3b, 3c, respectively.
Figure 4B:
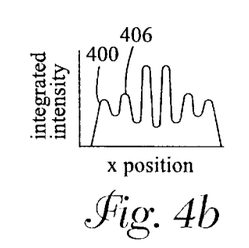

Referring to FIG. 3b, in a first embodiment according to the invention, search line 300 is created at one side of the image at a base angle θ to the side of the image (θ can be 0, as shown in the drawing), and swept across the image in steps. At each step, the integrated intensity of each centroid within a predetermined region (the "smoothing window") on either side of the line is determined and recorded. The result is a two dimensional plot with a series of peaks, each peak corresponding to a column of the grid, as shown in FIG. 4b.

This process is different from simply integrating the image intensity along the search line. Due to the use of collapsed images, each feature effectively has its image intensity and area concentrated at its centroid. This will be referred to herein as "centroid integration".

With proper selection of the size of the smoothing window, centroid integration results in a set of very well defined peaks in the resulting line profile. Regular integration would result in a set of smeared out peaks and, in the case of a grid with some variation in the positions of the individual features, the result would often be unusable. As a result, centroid integration is much more tolerant of local variation in feature positions than conventional integration.

A smoothing window W is used to take into account the local variability of the centroids from their nominal positions. The window size should be based on the pitch of the rows and columns being analyzed. The desired size of smoothing window W is that size which will most clearly generate distinct peaks in the integrated intensity during centroid integration. The smoothing window can be adjusted manually or by any technique which can establish distinct peaks. The minimum value for W in pixels is 1. If the pitch spacing P in pixels is known and is greater than 4, the optimum smoothing window W in pixels will be about:

$$W = 0.35 * P - 1.53$$

This equation has been determined empirically by evaluating a wide range of samples with local feature variations ranging from 0 (no deviation from a regular grid) to 50% (the variation in feature position is so large that the rows or columns overlap).

If the pitch spacing P is not known, one technique for automating the initial selection is to assume that the number of features in each row and column is the square root of the number of features identified in creating the collapsed image, then to approximate the pitch P of the rows and columns by dividing the size of the image by the square root of the number of features. Alternatively, if the nominal dimensions of the grid can be determined (see the second embodiment below), the pitch P can be approximated by dividing the nominal grid dimensions by the square root of the number of features. In either case, the initial smoothing window W can be determined using the equation above. If needed, this initial smoothing window W can be optimized by re-evaluating data to the data using a smoothing window W' varying around this smoothing window W, and selecting the smoothing window W' that provides the clearest peaks.

Figure 3C:
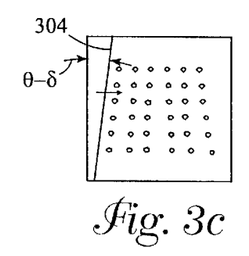

Turning to FIG. 3a, centroid integration is repeated with a second search line 302 at a slight variance angle (+δ) to the original search angle θ, and in FIG. 3c, with a third search line 304 at a slight variance angle (−δ) to the original search angle θ.

The slope of the first peak 400, 402, 404 (FIGS. 4b, 4a, 4c, respectively) in the resulting centroid integration for the three search lines 300, 302, 304 is determined. The first peak in each graph represents the first column in the grid, and the steeper the slope of the first peak, the closer that corresponding search line was to being parallel to the column of the grid.

If the difference between the slopes of the three peaks 400, 402, 404 is above a predetermined threshold (i.e., outside a tolerance limit), the line 300, 302, 304 with the steepest corresponding first peak slope is identified (line 304 in the example shown in the drawings), and the process is iterated using varying values of θ and δ, until the differences are within the tolerance limit. To this, if the peak 400 has the steepest slope, the next iteration preferably uses the same value for θ as the prior iteration, but a smaller value for δ, while if the peak 400 does not have the steepest slope, the next iteration preferably uses the same value for 6 as the prior iteration, but resets θ to match the angle of whichever of lines 302, 304 corresponds to the peak 402, 404 with the steepest slope. The entire process is iterated until the difference between the three slopes is within the tolerance limit. The angle of the final line with the steepest first peak slope will match the angle of the first column of the grid (within the predetermined tolerance limit).

A best fit match at that angle is made of centroids within a predetermined distance (which may or may not be same as the smoothing window W) of the final line to define the nominal position of the first column.

While the best fit for the columns can be identified by finding the crest of the peaks in the centroid integration, columns alternatively may be identified by using the blank regions between peaks in the centroid integration plot to determine the limits on each column, particularly if the blank regions are easier to identify in a particular situation. The centroids within each defined column are used to define a best fit line for the column, with each centroid being weighed by a combination of its area and/or its integrated intensity.

Figure 4C:
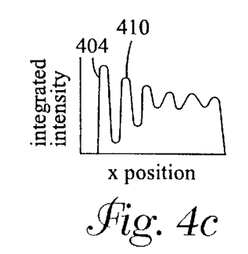

This process is repeated for each peak. For example, the second peaks 406, 408, 410, correspond to the second column, so the search line with the steepest slope on the second peak is the closest to the angle of the second line of the grid. Repeating centroid integration using sweep lines at a base angle θ and variance angles (±δ) to find the slope of the second peak can define the angle of the best fit line for the second column. The process is repeated for each peak.

After the first peak, it is not necessary to start the sweep lines at the side of the image. Each sweep line can be started from the position of the prior column, as shown by line 312 in FIG. 3b. In addition, the angle of each column will probably be reasonably close to the angle of the prior column, so the number of sweeps usually can be minimized by starting with a base angle θ matching the angle of the prior column.

Once the position and orientation of each of the columns is identified, the next step is identifying the rows generally orthogonal to the columns just identified. The rows can be found using substantially the same process just used to identify the columns, but starting from a side of the image adjacent to the side used to find the columns.

Figure 5:
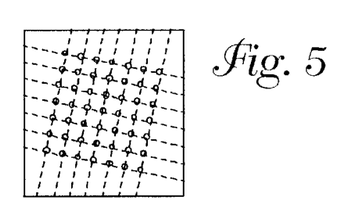
FIG. 5 illustrates a method according to the present invention of defining a set of nominal points on the grid in the image of FIG. 2.

The intersections of the best fit columns and the best fit rows are determined, and used to define the nominal points in the grid, as shown in FIG. 5. Preferably, to avoid singularities in the fitting, the equations describing the columns are of the form x=my+b (as opposed to the conventional y=mx+b used for the rows).

Figure 6:
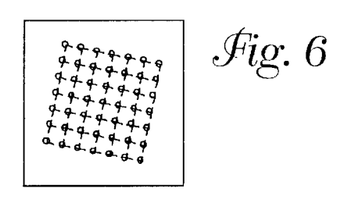
FIG. 6 illustrates a method according to the present invention of defining a set of final points on the grid in the image of FIG. 2.

The nominal grid of FIG. 5 is "flexed" to match the actual centroid locations to the nominal locations to generate a final grid, as shown in FIG. 6. This is done by performing a search for a local centroid within a predefined distance from each nominal grid point. If a local centroid is found, then the position of the local centroid is designated as the final grid point.

Figure 22:
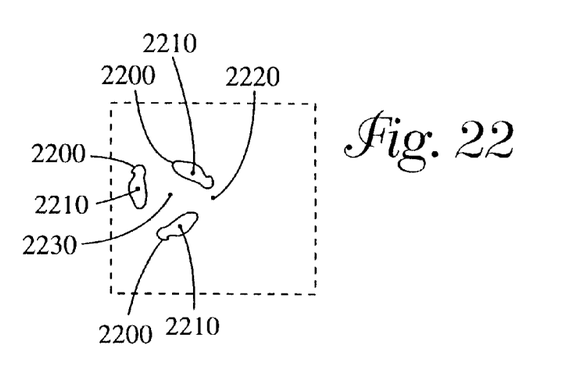
FIG. 22 is a detailed illustration of features representing a particular object in the image of FIG. 2.

In some situations, only portions of a single object on a sample will appear in an image, as shown in FIG. 22, which is a close-up view of the image of FIG. 2 around a single nominal grid point 2220. This results in multiple features 2200 being identified instead of a single feature. This might happen, for example, due to the characteristics of the object on the sample, or due to the image capture technique. To overcome this possibility, preferably the centroids 2210 of the features 2200 which are within the predefined distance of the nominal grid point 2220 are identified. A centroid 2230 of these centroids 2210 determined, and the position of this centroid 2230 of centroids 2210 then is defined as the final grid point.

If no local centroid or centroid of centroids is found, then the location of the nominal grid point is used as the position of the final grid point, on the assumption that a feature in the grid is missing.

After flexing, the result is an array of addresses representing the positions of the actual or expected elements of the grid, which can be used for further analysis, as described below.

While the foregoing first embodiment can accommodate grids that are rotated and grids that are distorted such that the grid elements are still generally in straight lines, it has difficulties with grids that are distorted into curved lines. A second embodiment therefore is provided which can be used instead of or in addition to the first embodiment. The second embodiment is effective for grids that are curved in a single direction, as sometimes results from shrinkage of a polymeric or other substrate along a particular axis.

Figure 7:
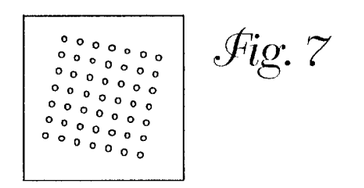
FIG. 7 is an illustration of a second image which might be captured by the scanning system of FIG. 1.
Figure 8:
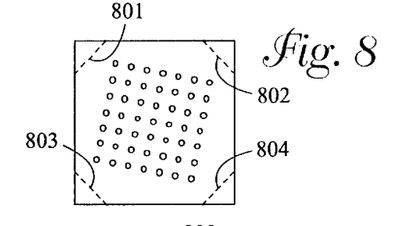
FIG. 8 illustrates a method according to the present invention for identifying the corners of the grid in the image of FIG. 7.
Figure 9:
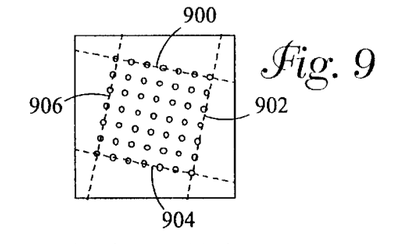
FIG. 9 illustrates a method according to the present invention for identifying the nominal outline of the grid in the image of FIG. 7.

Referring to FIG. 7, an image is captured. The significant features in the image are identified and a collapsed image created in the same fashion as in the first embodiment. In FIG. 8, computer 22 creates search line 801 at one corner of the image, with its normal bisector pointing toward the center of the image. Computer 22 steps search line 801 toward the center of the image. The centroid of the first feature which has an area and/or integrated intensity above a predetermined threshold which is encountered by search line 801 as it moves toward the center of the image is identified as the corner centroid for that search line. This process is repeated with search lines 802, 803, 804 from each of the other corners. Referring to FIG. 9, lines 900, 902, 904, 906 are defined between the corner centroids just identified to define the nominal outline of the grid.

It will be appreciated that while the lines have been shown and described as moving from the corners of the image, this is not necessary; the search lines could move from any edge of the image. In addition, if confidence is high in the dimensions of the grid, two approximately orthogonal search lines would be sufficient to identify the orientation and placement of the grid.

Figure 10:
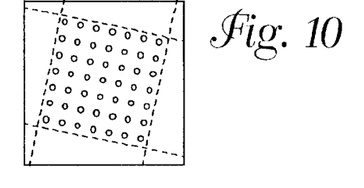
FIG. 10 illustrates a method according to the present invention for determining whether the grid in the image of FIG. 7 is likely to be rectilinear or curved.

In FIG. 10, computer 22 searches outside of the nominal outline of the grid for additional centroids. Centroids within some predetermined margin of the nominal outline will be considered "within" the outline, to allow for some local position variation in the grid, but centroids beyond that margin are considered outside of the nominal outline. If all of the centroids are within the nominal outline of the grid, then it can be assumed that the grid is (a) generally rectilinear. If centroids fall outside of the nominal outline, then it is likely that the grid is (b) curved in at least one direction.

Figure 11:
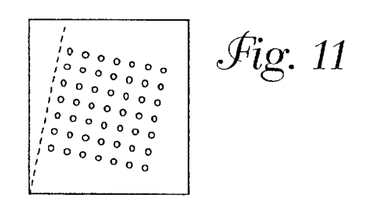
FIG. 11 illustrates a centroid integration process applied to the image of FIG. 7 according to the present invention.
Figure 12:
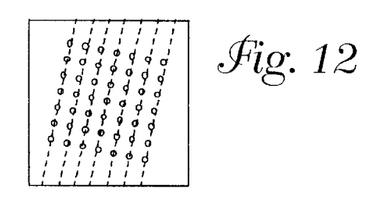
FIG. 12 illustrates a method according to the present invention of defining a set of nominal columns on the grid in the image of FIG. 7.
Figure 13:
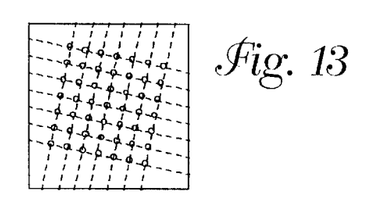
FIG. 13 illustrates a method according to the present invention of defining a set of nominal points on the grid in the image of FIG. 7.

If the grid is considered to be (a) generally rectilinear, the process of the first embodiment can be used to identify the columns and lines. Alternatively, in FIG. 11, computer 22 starts a search line parallel to a side of the nominal outline of the grid, and moves it toward the opposite side, performing centroid integration along the way. A best fit of the centroid integration peaks is made to define the best fit columns shown in FIG. 12. Essentially the same process is repeated in the opposite direction of the grid to find the nominal rows. The nominal positions of the grid elements are defined by finding the intersections of the best fit columns and rows, as shown in FIG. 13, and the grid points flexed, as described in the first embodiment.

Figure 14:
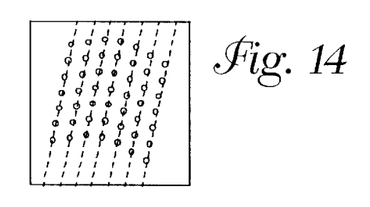
FIG. 14 illustrates a method according to the present invention of defining a set of nominal columns on the grid where the grid is curved.
Figure 15:
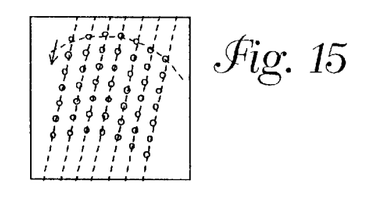
FIG. 15 illustrates a method according to the present invention of defining the shape of the curve in the grid in the image of FIG. 14.

If the grid is curved, as shown in FIG. 14, upon checking for centroids outside of the nominal grid outline, centroids will be found to be outside of the nominal outline, so it will be assumed that the grid is (b) curved. If centroids are found outside just one side of the nominal outline or it is otherwise is known that the grid is likely to be curved only in a single direction, then the simplest method for identifying the nominal grid positions is shown in FIGS. 14–16.

In this method, it is assumed that the curve is convex on the side towards which the centroids were found outside of the nominal outline. The sides adjacent to that side are presumed to be generally straight. A process like that used in either the first embodiment or in FIGS. 11 and 12 can be used to identify the columns in this array parallel to the generally straight sides, as shown in FIG. 14. Once the columns are identified, a search down each column starting from the end thereof either towards or away from the convex side can quickly identify the first centroid in each column, which presumably forms a portion of the first curved row. A best fit is done of the first feature from every column to create a nominal curve, as shown in FIG. 15. The nominal curve is moved down the grid to perform centroid integration, but using a curve instead of a line.

Figure 16:
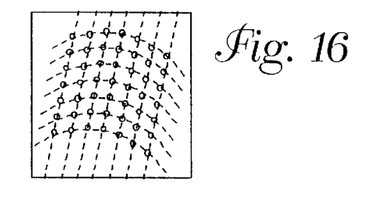
FIG. 16 illustrates a method according to the present invention of defining a set of nominal points on the grid in the image of FIG. 14.

The result, shown in FIG. 16, is a nominal grid of straight columns and curved rows. As in the other embodiments, the intersections of the nominal columns and curved rows define the nominal grid points, and the grid is flexed to identify the final grid points.

Figure 17:
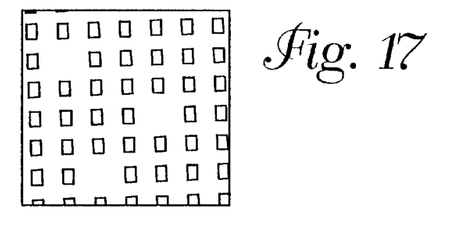
FIG. 17 is an illustration of a third image which might be captured by the scanning system of FIG. 1.
Figure 18:
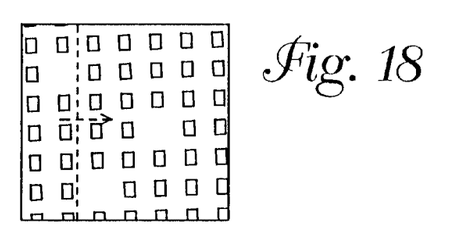
FIG. 18 is an illustration of a centroid integration process applied to the image of FIG. 17 according to the present invention.
Figure 19:
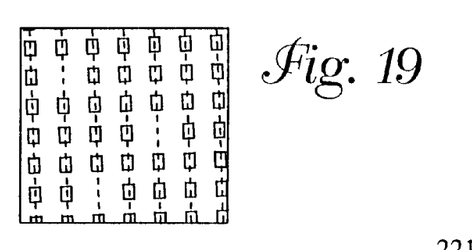
FIG. 19 illustrates a method according to the present invention of defining a set of nominal columns on the grid in the image of FIG. 17.

In many applications, particularly those involving a moving web during manufacturing, only a portion of the grid may be visible in the image. The process of the first embodiment can handle this situation directly, but the complete process of the second embodiment cannot, since no corners can be identified. However, in this situation, it normally can be assumed that the image orientation can be predetermined by virtue of the positioning of the image detector on the web production line, so that the grid orientation in the image is known, such as shown in FIG. 17. In this situation, the expected grid orientation can be used to establish the orientation of the search line. A search line can be started parallel to the expected orientation, as shown in FIG. 18, and moved across the image performing centroid integration. This will result in peaks of integrated intensity that can be used to generate best fit lines, such as shown in FIG. 19. The process can be repeated in the opposite direction, resulting in a set of nominal best fit lines in that direction. If the grid is curved, the process just described for the second embodiment can be used to define the needed curve. Intersections of the resulting rows and columns define a nominal grid, which can be flexed to identify the final grid points.

As will be apparent, the present invention can accept grids in many orientations. Given this flexibility, it is generally advisable to provide some characteristic element or feature on the grid which identifies a specific side or corner of the grid. For example, one feature in the grid array could be used as a marker. Then, no matter what the orientation of the grid in the field of view, the correct orientation of the grid elements relative to predetermined information, such as the nature of the chemicals being testing in each grid element, will be known.

Figure 20:
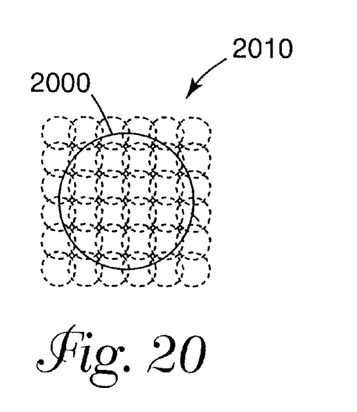
FIG. 20 illustrates the position of pixels around an individual grid feature in any of the images of FIGS. 2, 7, 14 or 17.

Once the position, orientation and dimensions of the grid are known, this information can advantageously be used to reduce the time required to collect the information actually being measured. In a typical image, a given feature will span several pixels. As shown in FIG. 20, feature 2000 spans a 6×6 set of pixels 2010. To scan the pixels in feature 2000, motor 24 moves mirror 14 to direct the scanning beam on each pixel 2010 in turn. Measurements are made of each pixel 2010.

Figure 21:
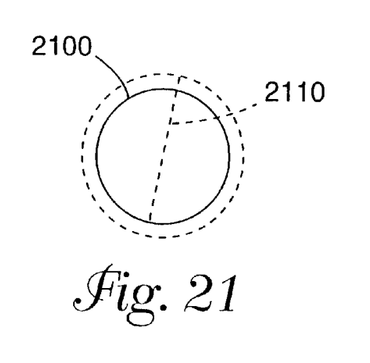
FIG. 21 illustrates a process of re-adjusting the system of FIG. 1 to encompass an entire feature in any of the images of FIGS. 2, 7, 14 or 17.

Alternatively, as shown in FIG. 21, the scanning beam can be re-adjusted to have a diameter 2110 slightly larger than the feature 2100. Using this technique, the entire feature can be measured at one time. This is particularly advantageous when measuring the total luminescence or similar characteristic of a feature. The scanning beam can be re-adjusted on each feature in the grid. The total number of measurements needed thus is minimized, and exactly matches the total number of significant features.

It will be understood that these exemplary embodiments in no way limit the scope of the invention. Other modifications of the invention will be apparent to those skilled in the art in view of the foregoing description. For example, the order in which many of the steps of the method of the invention are executed may be varied from that described and claimed here, while still achieving the same result and without departing from the scope of the present invention. These descriptions are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and scope of the appended claims are covered.

I claim:

1. A method of identifying the position in an image of a plurality of features in a substantially four-side, four-cornered grid of features, each feature having a centroid, comprising:
   a) obtaining an image;
   b) identifying the significant features in the image;
   c) defining centroids for each significant feature;
   d) placing a first integration line contiguous to a first side of the image at an angle $\theta$ to the first side;
   e) recording the centroid integrated intensity of each feature that has its centroid within a predetermined region on either side of the first integration line;
   f) stepping the first integration line across the image;
   g) repeating steps (e) and (f) until the first integration line has crossed at least the portion of the image in which a grid is likely to be found;
   h) analyzing the recorded integrated intensities to find the slope of the first peak in the integrated intensities recorded for the first integration line;
   i) repeating steps (d) through (h) for a second integration line at an angle $\theta+\delta$ to the side of the image, and for a third integration line at an angle $\theta-\delta$ to the side of the image;
   j) determining the difference in the slopes of the first peak in the integrated intensities recorded for the first, second and third integration lines;
   k) if the difference is within a predetermined tolerance limit, defining the one of the first, second or third integration line having its first peak with the highest slope among the three lines as the closest match, and defining the angle of the first column in the grid to match the angle of the closest match, and the position of the first column in the grid to match the location of the first peak in the integrated intensities for closest match;
   l) if the difference is not within the predetermined tolerance limit, iterate steps (d) through (l) with varying values of $\theta$ and $\delta$ until the difference in the slopes is within the predetermined tolerance limit.

2. The method of claim 1, wherein the values of $\theta$ and $\delta$ are varied during each iteration by the method comprising:
   a) determining if the first integration shape has the peak with the highest slope;
   b) if it does, using the same base angle $\theta$ as in the prior iteration and a smaller value for $\delta$ than in the prior iteration; and
   c) if it does not, resetting the base angle $\theta$ to match the angle of the integration shape having the peak with the highest slope in the prior iteration and using the same value for $\delta$ as in the prior iteration.

3. The method of claim 1, further comprising defining the position of subsequent columns in the grid by:
   a) placing a fourth integration line contiguous to a prior column in the grid at an angle $\theta$ to the prior column;
   b) recording the centroid integrated intensity of each feature that has its centroid within a predetermined region on either side of the fourth integration line;
   c) stepping the fourth integration line across the image;
   d) repeating steps (b) and (c) until the fourth integration line has crossed at least a portion of the image to be analyzed;
   e) analyzing the recorded integrated intensities to find the slope of the peak one over from the peak corresponding to the prior column in the integrated intensities recorded for the fourth integration line;
   f) repeating steps (a) through (e) for a fifth integration line at an angle $\theta+\delta$ to the prior column, and for a sixth integration line at an angle $\theta-\delta$ to the prior column;
   g) determining the difference in the slopes of the first peak in the integrated intensities recorded for the fourth, fifth and sixth integration lines;
   h) if the difference is within a predetermined tolerance limit, defining the one of the fourth, fifth and sixth integration lines for which the peak one over from the peak corresponding to the prior column has the highest slope among the three lines as the closest match, and defining the angle of the subsequent column in the grid to match the angle of the closest match, and the position of the subsequent column in the grid to match the location of the peak one over from the peak corresponding to the prior column in the integrated intensities for the closest match;

i) if the difference is not within the predetermined tolerance limit, iterate steps (a) through (i), with varying values of θ and δ until the difference in the slopes is within the predetermined tolerance limit.

4. The method of claim 3, further comprising defining the positions of all columns in the grid by iterating the process of claim 3 until all columns in the grid are defined.

5. The method of claim 4, further comprising defining the rows in the grid using substantially the same process as in claim 3, where the first integration line is placed at a side of the image substantially orthogonal to the first side of the image.

6. The method of claim 5, comprising defining the nominal positions of the features in the grid as the intersections of the columns and rows.

7. The method of claim 6, further comprising identifying missing features by identifying each nominal position a feature in the grid which does not have an actual centroid within a predetermined distance of the nominal position for that feature.

8. The method of claim 6, further comprising identifying the actual positions of the features in the grid by identifying the position of the centroid closest to each identified nominal position of a feature in the grid and defining the position of the centroid closest to each identified nominal position of a feature in the grid as the actual position for that feature in the grids.

9. The method of claim 6, further comprising, for each nominal position in the grid, identifying the centroids of all features within a predefined distance of the nominal position and defining a centroid of all such centroids.

10. The method of claim 9, further comprising defining each centroid of centroids as the actual position of a corresponding feature in the grid.

11. The method of claim 10, further comprising using the actual position of the features in the grid to control an analysis process such that the process analyzes only the portions of the image containing features.

12. The method of claim 1, wherein the distance by which the integration lines are stepped is equal to a smoothing window W, and the smoothing window W established such that it most clearly generates distinct peaks in integrated intensity during centroid integration.

13. The method of claim 12, wherein a pitch spacing of the rows and columns is P, and the smoothing window is set to the greater of (i) one and (ii) approximately:

$$W=0.35*P-1.53.$$

14. The method of claim 13, herein the pitch spacing P is determined by dividing the length of a side of the image by the square root of the number of features in the image.

15. A method of identifying the position and nominal outline in an image of a substantially four-sided, four-cornered grid of features, comprising:

a) obtaining an image;

b) identifying the significant features in the image;

c) defining a centroid for each significant feature;

d) placing a search line at a first point on the perimeter of the image and moving it across the image until it contacts a first centroid;

e) defining the position of the first centroid as the first corner of the grid;

f) placing a second search line which is substantially parallel to the first search line at a second point on the perimeter of the image substantially diametrically opposite from the first point and moving it across the image until it contacts a second centroid;

g) defining the position of the second centroid as the second corner of the grid;

h) if the grid is known to be square, defining a nominal outline of the four sides of the grid by defining a square with diagonally opposite corners oriented at the first and second corners of the grid.

16. The method of claim 15, further comprising:

a) placing a third search line which is substantially orthogonal to the first search line at a third point on the perimeter of the image substantially a quarter of the way around the perimeter of the image from the first and second points and moving it across the image until it contacts a third centroid;

b) defining the position of the third centroid as the third corner of the grid;

c) if the grid is known to be generally rectangular, defining a nominal outline of the four sides of the grid by defining a rectangle having three of its corners positioned at the first, second and third corners.

17. The method of claim 16, further comprising:

a) placing a fourth search line which is substantially parallel to the third search line at a fourth point on the perimeter of the image substantially diametrically opposite from the third point and moving it across the image until it contacts a fourth centroid;

b) defining the position of the fourth centroid as the fourth corner of the grid c) defining a nominal outline of the four sides of the grid by fitting lines between the first, second, third and fourth corners.

18. A method of identifying the position in an image of each of a plurality of features in a grid, where the orientation of sides of the grid are known, the method comprising:

a) obtaining an image;

b) identifying the significant features in the image;

c) defining a centroid for each significant feature;

d) placing a first integration line parallel to a first side of the grid;

e) recording a centroid integrated intensity of each feature that has its centroid within a predetermined region on either side of the first integration line;

f) stepping the first integration line across the image towards a side of the grid opposite to the first side;

g) repeating steps (e) and (f) until the first integration line passes entirely outside of a portion of the grid to be analyzed;

h) analyzing the recorded integrated intensities to identify a set of best fit rows of the centroids substantially parallel to the first integration line;

i) defining a second integration line parallel to a second side of the grid substantially orthogonal to the first side;

j) recording the centroid integrated intensity of each feature that has its centroid within a predetermined region on either side of the second integration line;

k) stepping the second integration line across the image towards a side of the grid opposite to the second side;

l) repeating steps (j) and (k) until the second integration line passes entirely outside of a portion of the grid to be analyzed;

m) analyzing the recorded integrated intensities to identify a set of best fit columns of the centroids substantially parallel to the second integration line;

n) defining the nominal positions of the features in the grid as the intersections of the sets of best fit rows and columns.

19. The method of claim 18, further comprising identifying the actual positions of the features in the grid by defining the position of the centroid closest to each identified nominal position of a feature in the grid as the actual position for that feature in the grid.

20. The method of claim 18, further comprising, for each nominal position in the grid, identifying the centroids of all features within a predefined distance of the nominal position and defining a centroid of all such centroids.

21. The method of claim 20, further comprising defining each centroid of centroids as the actual position of a corresponding feature in the grid.

22. The method of claim 21, further comprising identifying missing features by identifying any nominal position for a feature in the grid which does not have an actual centroid within a predetermined distance of the nominal position for that feature.

23. The method of claim 21, further comprising using the actual position of the features in the grid to control an analysis process such that the process analyzes only the portions of the image containing features.

24. The method of claim 18, wherein a position and orientation of a nominal outline of the grid are known, further comprising a method of determining whether the grid may curve in one direction, the method comprising:

a) identifying features outside the nominal outline for the grid;

b) determining whether substantially all such features fall on one side of the nominal outline;

c) if so, identifying that side of the grid as being an outwardly curved side.

25. The method of claim 24, further comprising a method of identifying the nominal positions of each feature in the grid, where each feature has a centroid and where the grid is curved in one direction, the method comprising:

a) identifying the side of the nominal outline outside which features are found, define this as the first side of the nominal outline and assume this is an outwardly curved side;

b) placing an integration line parallel to and outside of a second side of the nominal outline that is substantially orthogonal to the first side;

c) recording a centroid integrated intensity of each feature that has its centroid within a predetermined region on either side of the integration line;

d) stepping the integration line across the image towards a side of the nominal outline opposite to the second side;

e) repeating steps (c) and (d) until the integration line passes entirely outside of the nominal outline;

f) analyzing the recorded integrated intensities to identify a set of best fit rows of centroids substantially parallel to the first integration line;

g) locating the centroids at one end of each best fit row and defining a best fit nominal curve through those centroids;

h) defining an integration curve positioned at a location in the image outside all centroids, having the shape of the best fit nominal curve, and oriented to be parallel to a best fit nominal curve positioned to intersect the corners of the nominal outline at either end of the first side of the nominal outline and;

i) recording the centroid integrated intensity of each feature that has its centroid within a predetermined region on either side of the integration curve;

j) stepping the search curve line across the image towards the side of the nominal outline opposite to the first side;

k) repeating steps (i) and (1) until the integration curve passes entirely outside of the nominal outline;

l) analyzing the recorded integrated intensities to identify a set of best fit curved columns of centroids substantially parallel to the integration curve;

m) defining the nominal positions of the features in the grid as the intersections of the sets of best fit rows and curved columns.

26. The method of claim 25, further comprising identifying the actual position of the features in the grid defining the position of the centroid closest to each identified nominal position of a feature in the grid as the actual position for each feature in the grid.

27. The method of claim 26, further comprising identifying missing features by identifying each nominal position for a feature in the grid which does not have an actual centroid within a predetermined distance of the nominal position for that feature.

28. The method of claim 26 further comprising, for each nominal position in the grid, identifying the centroids of all features within a predefined distance of the nominal position and defining a centroid of all such centroids.

29. The method of claim 28, further comprising defining each centroid of centroids as the actual position of a corresponding feature in the grid.

30. The method of claim 29, further comprising using the actual positions of the features in the grid to control an analysis process such that the process analyzes only the portions of the image containing features.

31. The method of claim 18, wherein the distance by which the integration lines are stepped is equal to a smoothing window W, and the smoothing window W is established such that it most clearly generates distinct peaks in integrated intensity during centroid integration.

32. The method of claim 31, wherein a pitch spacing of the rows and columns is P, and the smoothing window is defined as the greater of (i) one and (ii) approximately:

$$W = 0.35 * P - 1.53.$$

33. The method of claim 32, wherein the pitch spacing P is determined by dividing the length of a side of the nominal outline of the grid by the square root of the number of features in the image.

34. A method of identifying an actual position of an object in an image, where a nominal position of the object is known, the method comprising:

a) obtaining an image;

b) identifying the significant features in the image;

c) defining a centroid for each significant feature;

d) identifying the position of all centroids in the image within a predetermined distance of the nominal position, and defining a centroid of such centroids; and e) identifying the position of the centroid of the centroids as the actual position of the object in the image.

35. A system for identifying the position in an image of a plurality of features in a substantially four-side, four-cornered grid of features, each feature having a centroid, the system comprising:
- a) an image capture device for capturing an image;
- b) a data storage device; and
- c) a central processing unit for receiving a captured image from the image capture device and which can write to and read from the data storage unit, the central processing unit being programmed to:
  - i) obtain an image;
  - ii) identify the significant features in the image;
  - iii) define centroids for each significant feature;
  - iv) place a first integration line contiguous to a first side of the image at an angle $\theta$ to the first side;
  - v) record in the data storage device the centroid integrated intensity of each feature that has its centroid within a predetermined region on either side of the first integration line;
  - vi) step the first integration line across the image;
  - vii) repeat steps (v) and (vi) until the first integration line has crossed at least a portion of the image to be analyzed;
  - viii) analyze the recorded integrated intensities to find the slope of the first peak in the integrated intensities recorded for the first integration line;
  - ix) repeat steps (iv) through (viii) for a second integration line at an angle $\theta+\delta$ to the side of the image, and for a third integration line at an angle $\theta-\delta$ to the side of the image;
  - x) determine the difference in the slopes of the first peak in the integrated intensities recorded for the first, second and third integration lines;
  - xi) if the difference is within a predetermined tolerance limit, define and record in the data storage device the one of the first, second or third integration line having its first peak with the highest slope among the three lines as the closest match, and define and record in the data storage device the angle of the first column in the grid to match the angle of the closest match, and the position of the first column in the grid to match the location of the first peak in the integrated intensities for closest match;
  - xii) if the difference is not within the predetermined tolerance limit, iterate steps (iv) through (xii) with varying values of $\theta$ and $\delta$ until the difference in the slopes is within the predetermined tolerance limit.

36. The system of claim 35, wherein the central processing unit further is programmed to vary the values of $\theta$ and $\delta$ during each iteration by:
- a) determining if the first integration shape has the peak with the highest slope;
- b) if it does, using the same base angle $\theta$ as in the prior iteration and a smaller value for $\delta$ than in the prior iteration; and
- c) if it does not, resetting the base angle $\theta$ to match the angle of the integration shape having the peak with the highest slope in the prior iteration and using the same value for $\delta$ as in the prior iteration.

37. The system of claim 35, wherein the central processing unit further is programmed to define the position of subsequent columns in the grid by:
- a) placing a fourth integration line contiguous to a prior column in the grid at an angle $\theta$ to the prior column;
- b) recording in the data storage device the centroid integrated intensity of each feature that has its centroid within a predetermined region on either side of the fourth integration line;
- c) stepping the fourth integration line across the image;
- d) repeating steps (b) and (c) until the fourth integration line has crossed at least a portion of the image to be analyzed;
- e) analyzing the recorded integrated intensities to find the slope of the peak one over from the peak corresponding to the prior column in the integrated intensities recorded for the fourth integration line;
- f) repeating steps (a) through (e) for a fifth integration line at an angle $\theta+\delta$ to the prior column, and for a sixth integration line at an angle $\theta-\delta$ to the prior column;
- g) determining the difference in the slopes of the first peak in the integrated intensities recorded for the fourth, fifth and sixth integration lines;
- h) if the difference is within a predetermined tolerance limit, defining and recording in the data storage device the one of the fourth, fifth and sixth integration lines for which the peak one over from the peak corresponding to the prior column has the highest slope among the three lines as the closest match, and defining and recording in the data storage device the angle of the subsequent column in the grid to match the angle of the closest match, and the position of the subsequent column in the grid to match the location of the peak one over from the peak corresponding to the prior column in the integrated intensities for the closest match;
- i) if the difference is not within the predetermined tolerance limit, iterate steps (a) through (h), with varying values of $\theta$ and $\delta$ until the difference in the slopes is within the predetermined tolerance limit.

38. The system of claim 37, wherein the central processing unit further is programmed to define the positions of all columns in the grid by iterating the process of claim 37 until all columns in the grid are defined.

39. The system of claim 38, wherein the central processing unit further is programmed to define the rows in the grid using substantially the same process as in claim 38, where the first integration line is placed at a side of the image substantially orthogonal to the first side of the image.

40. The system of claim 39, wherein the central processing unit further is programmed to define the nominal positions of the features in the grid as the intersections of the columns and rows.

41. The system of claim 40, wherein the central processing unit further is programmed to identify missing features by identifying each nominal position for a feature in the grid which does not have an actual centroid within a predetermined distance of the nominal position for that feature.

42. The system of claim 40, wherein the central processing unit further is programmed to identify the actual positions of the features in the grid by identifying the position of the centroid closest to each identified nominal position of a feature in the grid and defining the position of the centroid closest to each identified nominal position of a feature in the grid as the actual position for that feature in the grid.

43. The system of claim 40, wherein the central processing unit further is programmed to identify, for each nominal position in the grid, the centroids of all features within a predefined distance of the nominal position and defining a centroid of all such centroids.

44. The system of claim 43, wherein the central processing unit further is programmed to define each centroid of centroids as the actual position of a corresponding feature in the grid.

45. The system of claim 44, wherein the central processing unit further is programmed to use the actual position of the features in the grid to control an analysis process such that the process analyzes only the portions of the image containing features.

46. The system of claim 35, wherein the central processing unit further is programmed to step the integration lines by a distance equal to a smoothing window W, with the smoothing window W established such that it most clearly generates distinct peaks in integrated intensity during centroid integration.

47. The system of claim 46, wherein a pitch spacing of the rows and columns is P, and the smoothing window is set to the greater of (i) one and (ii) approximately:

$$W=0.35*P-1.53.$$

48. The system of claim 47, wherein the central processing unit determines the pitch spacing P by dividing the length of a side of the image by the square root of the number of features in the image.

49. A system for identifying the position and nominal outline in an image of a substantially four-side, four-cornered grid of features, the system comprising:
   a) an image capture device for capturing an image;
   b) a data storage device; and
   c) a central processing unit for receiving a captured image from the image capture device and which can write to and read from the data storage unit, the central processing unit being programmed to:
      i) obtain an image;
      ii) identify the significant features in the image;
      iii) define a centroid for each significant feature;
      iv) place a search line at a first point on the perimeter of the image and moving it across the image until it contacts a first centroid;
      v) define the position of the first centroid as the first corner of the grid;
      vi) place a second search line which is substantially parallel to the first search line at a second point on the perimeter of the image substantially diametrically opposite from the first point and moving it across the image until it contacts a second centroid;
      vii) define the position of the second centroid as the second corner of the grid;
      viii) if the grid is known to be square, defining a nominal outline of the four sides of the grid by defining a square with diagonally opposite corners oriented at the first and second corners of the grid and recording the nominal outline in the data storage device.

50. The system of claim 49, wherein the central processing unit further is programmed to:
   a) place a third search line which is substantially orthogonal to the first search line at a third point on the perimeter of the image substantially a quarter of the way around the perimeter of the image from the first and second points and move it across the image until it contacts a third centroid;
   b) defining the position of the third centroid as the third corner of the grid;
   c) if the grid is known to be generally rectangular, defining a nominal outline of the four sides of the grid by defining a rectangle having three of its corners positioned at the first, second and third corners and recording the nominal outline in the data storage device.

51. The system of claim 50, wherein the central processing unit further is programmed to:
   a) place a fourth search line which is substantially parallel to the third search line at a fourth point on t perimeter of the image substantially diametrically opposite from the third point and move it across the image until it contacts a fourth centroid;
   b) defining the position of the fourth centroid as the fourth corner of the grid
   c) defining a nominal outline of the four sides of the grid by fitting lines between the first, second, third and fourth comers and recording the nominal outline in the data storage device.

52. A system for identifying the position in an image of a plurality of features in a grid, where the orientation of sides of the grid is known, the system comprising:
   a) an image capture device for capturing an image;
   b) a data storage device; and
   c) a central processing unit for receiving a captured image from the image capture device and which can write to and read from the data storage unit, the central processing unit being programmed to:
      i) obtain an image;
      ii) identify the significant features in the image;
      iii) define a centroid for each significant feature;
      iv) place a first integration line parallel to a first side of the grid;
      v) record in the data storage device a centroid integrated intensity of each feature that has its centroid within a predetermined region on either side of the first integration line;
      vi) step the first integration line across the image towards a side of the grid opposite to the first side;
      vii) repeat steps (v) and (vi) until the first integration line passes entirely outside of a portion of the image to be analyzed;
      viii) analyze the recorded integrated intensities to identify a set of best fit rows of the centroids substantially parallel to the first integration line;
      ix) define a second integration line parallel to of a second side of the grid substantially orthogonal to the first side;
      x) record in the data storage device the centroid integrated intensity of each feature that has its centroid within a predetermined region on either side of the second integration line;
      xi) step the second integration line across-the image towards a side of the grid opposite to the second side;
      xii) repeat steps (x) and (xi) until the second integration line passes entirely outside of portion of the image to be analyzed;
      xiii) analyze the recorded integrated intensities to identify a set of best fit columns of the centroids substantially parallel to the second integration line;
      xiv) define the nominal positions of the features in the grid as the intersections of the sets of best fit rows and columns.

53. The system of claim 52, wherein the central processing unit further is programmed to identify the actual positions of the features in the grid by defining the position of the centroid closest to each identified nominal position of a feature in the grid as the actual position for that feature in the grid.

54. The system of claim 52, wherein the central processing unit further is programmed to identify, for each nominal position in the grid, the centroids of all features within a predefined distance of the nominal position and defining a centroid of all such centroids.

55. The system of claim 54, wherein the central processing unit further is programmed to define each centroid of centroids as the actual position of a corresponding feature in the grid.

56. The system of claim 55, wherein the central processing unit further is programmed to identify missing features by identifying any nominal position for a feature in the grid which does not have an actual centroid within a predetermined distance of the nominal position for that feature.

57. The system of claim 55, wherein the central processing unit further is programmed to use the actual position of the features in the grid to control an analysis process such that the process analyzes only the portions of the image containing features.

58. The system of claim 52, wherein a position and orientation of a nominal outline of the grid are known, and wherein the central processing unit further is programmed to determine whether the grid may curve in one direction by:
   a) identifying features outside the nominal outline for the grid;
   b) determining whether substantially all such features fall on one side of the nominal outline;
   c) if so, identifying that side of the grid as being an outwardly curved side.

59. The system of claim 58, wherein the central processing unit further is programmed to identify the nominal positions of each feature in the grid, where each feature has a centroid and where the grid is curved in one direction, by:
   a) identifying the side of the nominal outline outside which features are found, defining this as the first side of the nominal outline and assuming this is an outwardly curved side;
   b) placing an integration line parallel to and outside of a second side of the nominal outline that is substantially orthogonal to the first side;
   c) recording in the data storage device a centroid integrated intensity of each feature that has its centroid within a predetermined region on either side of the integration line;
   d) stepping the integration line across the image towards a side of the nominal outline opposite to the second side;
   e) repeating steps (c) and (d) until the integration line passes entirely outside of the nominal outline;
   f) analyzing the recorded integrated intensities to identify a set of best fit rows of centroids substantially parallel to the first integration line;
   g) locating the centroids at one end of each best fit row and defining a best fit nominal curve through those centroids;
   h) defining an integration curve positioned at a location in the image outside all centroids, having the shape of the best fit nominal curve, and oriented to be parallel to a best fit nominal curve positioned to intersect the corners of the nominal outline at either end of the first side of the nominal outline and;
   i) recording in the data storage device the centroid integrated intensity of each feature that has its centroid within a predetermined region on either side of the integration curve;
   j) stepping the search curve line across the image towards the side of the nominal outline opposite to the first side;
   k) repeating steps (i) and (j) until the integration curve passes entirely outside of the nominal outline;
   l) analyzing the recorded integrated intensities to identify a set of best fit curved columns of centroids substantially parallel to the integration curve;
   m) defining the nominal positions of the features in the grid as the intersections of the sets of best fit rows and curved columns.

60. The system of claim 53, wherein the central processing unit further is programmed to identify the actual position of the features in the grid by defining the position of the centroid closest to each identified nominal position of a feature in the grid as the actual position for each feature in the grid.

61. The system of claim 53, wherein the central processing unit further is programmed to identify, for each nominal position in the grid, the centroids of all features within a predefined distance of the nominal position and defining a centroid of all such centroids.

62. The system of claim 61, wherein the central processing unit further is programmed to define each centroid of centroids as the actual position of a corresponding feature in the grid.

63. The system of claim 62, wherein the central processing unit further is programmed to identify missing features by identifying each nominal position for a feature in the grid which does not have an actual centroid within a predetermined distance of the nominal position for that feature.

64. The system of claim 62, wherein the central processing unit further is programmed to use the actual positions of the features in the grid to control an analysis process such that the process analyzes the portions of the image containing features.

65. The system of claim 52, wherein the central processing unit further is programmed to step the integration lines by a distance equal to a smoothing window W, with the smoothing window W established such that it most clearly generates distinct peaks in integrated intensity during centroid integration.

66. The system of claim 65, wherein a pitch spacing of the rows and columns is P, and the smoothing window defined is the greater of (i) one or (ii) approximately:

$$W=0.35*P-1.53.$$

67. The system of claim 66, wherein the central processing unit determines the pitch spacing P by dividing the length of a side of the nominal outline of the grid by the square root of the number of features in the image.

68. A system for identifying an actual position of an object in an image, where a nominal position of the object is known, the system comprising:
   a) an image capture device for capturing an image;
   b) a central processing unit for receiving a captured image from the image capture device, the central processing unit being programmed to:
      i) obtain an image from the image capture device;
      ii) identify the significant features in the image;
      iii) define a centroid for each significant feature;
      iv) identify the position of all centroids in the image within a predetermined distance of the nominal position;
      v) define a centroid of such centroids; and
      vi) identify the position of the centroid of the centroids as the actual position of the object in the image.

* * * * *

UNITED STATES PATENT AND TRADEMARK OFFICE
CERTIFICATE OF CORRECTION

PATENT NO.   : 6,633,669 B1  Page 1 of 1
DATED        : October 14, 2003
INVENTOR(S)  : Atkinson, Matthew R. C.

It is certified that error appears in the above-identified patent and that said Letters Patent is hereby corrected as shown below:

Column 8,
Line 28, "value for 6" should be -- value for $\theta$ --

Column 9,
Line 58, "comer" should be -- corner --
Line 60, "comers" should be -- corners --

Column 13,
Line 55, "herein" should be -- wherein --

Column 20,
Line 4, "on t perimeter" should be -- on the perimeter --

Signed and Sealed this

Twenty-seventh Day of April, 2004

JON W. DUDAS
*Acting Director of the United States Patent and Trademark Office*